Jan. 18, 1955 F. J. AVERY 2,699,878
DIE HANDLING UNIT FOR LIFT TRUCKS
Filed Sept. 27, 1952 2 Sheets-Sheet 1
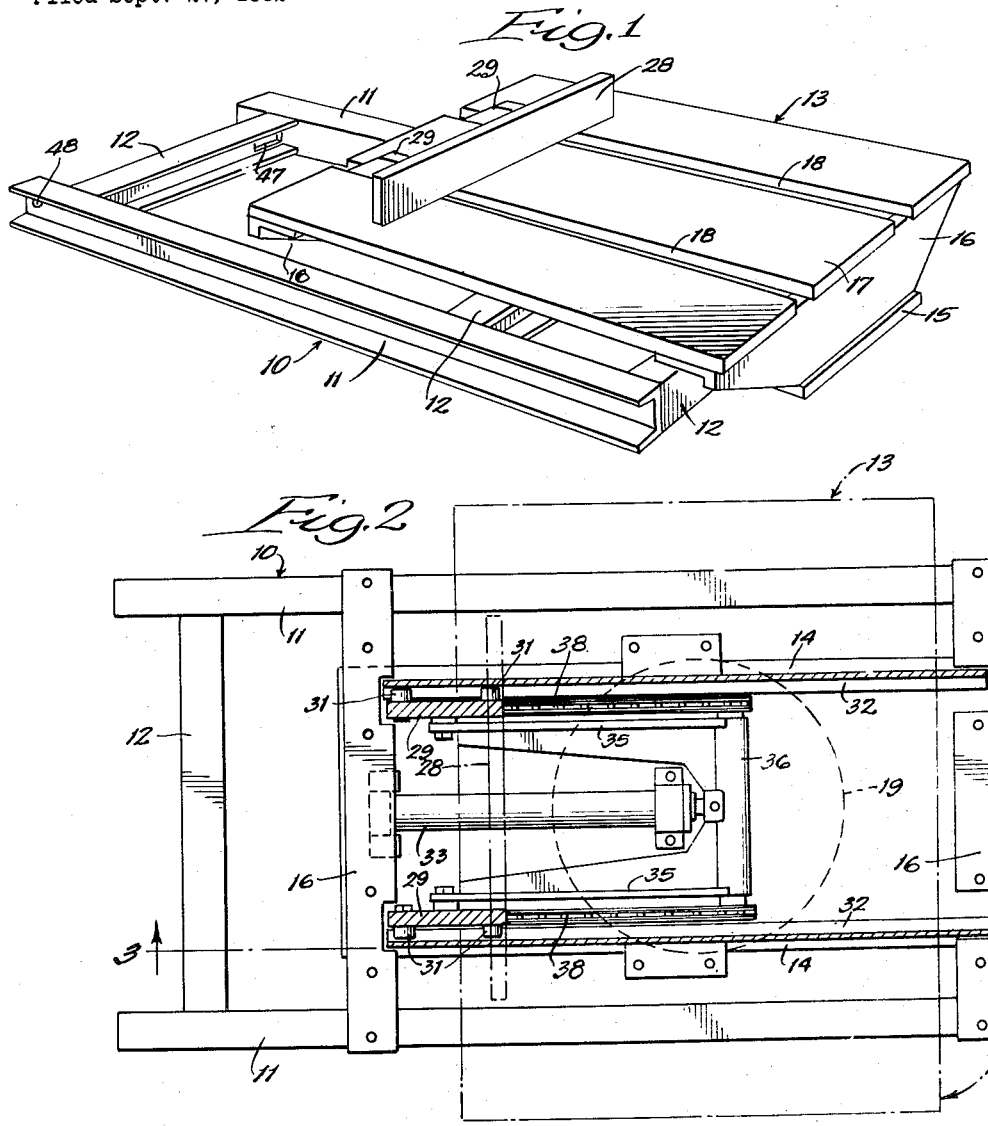
INVENTOR:
Fred J. Avery,
BY
Bair, Freeman & Molinare
ATTORNEYS.

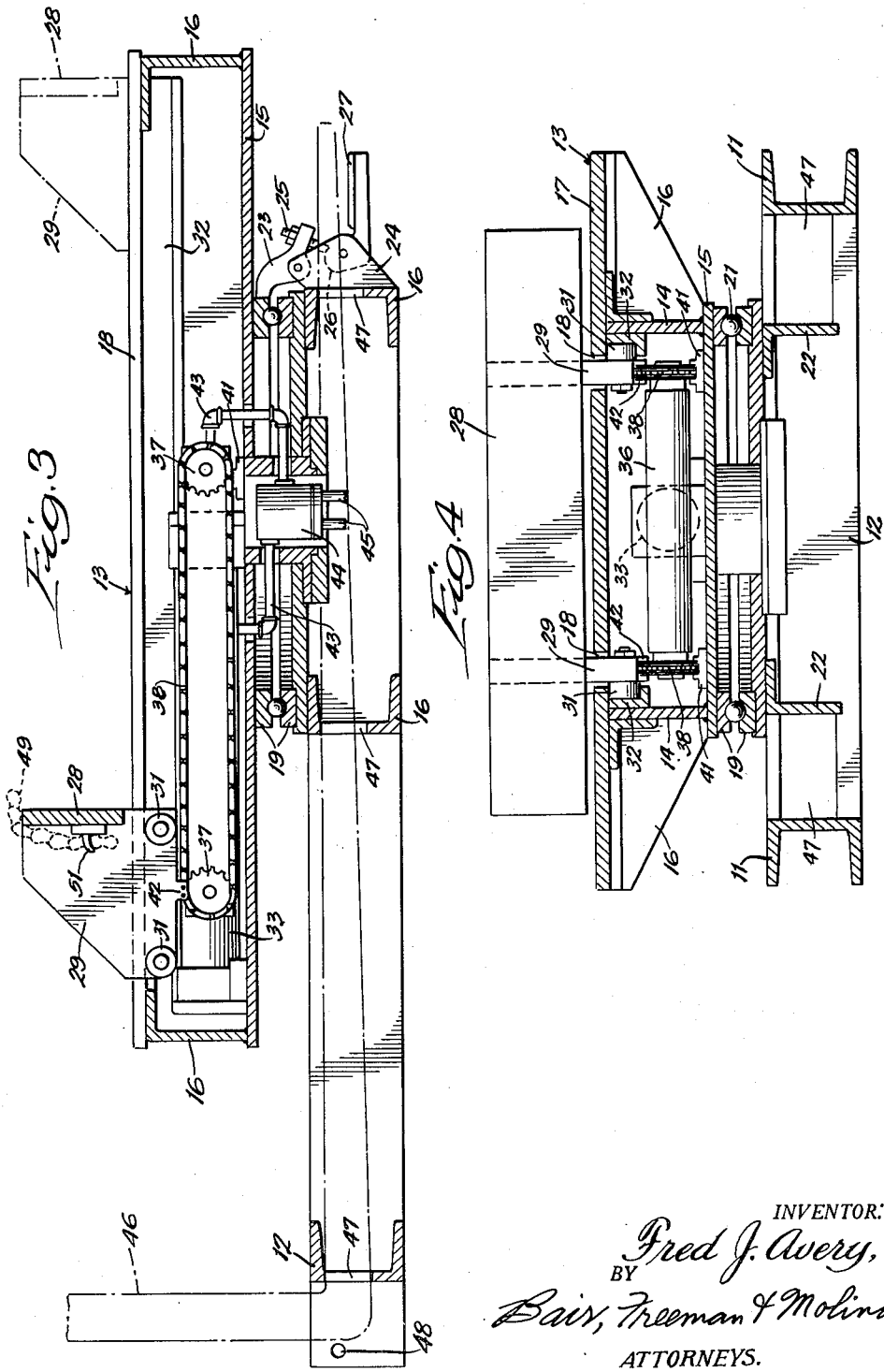

2,699,878

Patented Jan. 18, 1955

2,699,878

DIE HANDLING UNIT FOR LIFT TRUCKS

Fred J. Avery, La Grange, Ill., assignor to Materials Transportation Company, Chicago, Ill., a corporation of Illinois Application September 27, 1952, Serial No. 311,858

7 Claims. (Cl. 214—514)

This invention relates to a die handling unit and more particularly to a unit for loading, transporting and unloading dies and similar heavy articles on industrial fork trucks.

It is frequently necessary in factory operations to move dies and similar heavy objects from one place to another and to place the objects accurately. For example, dies are taken from storage and assembled on machines for machining operations and are then returned to storage at the end of a run. Since such dies may be from several hundred to several thousand pounds in weight and must be carefully handled and accurately placed on the machines, this is a difficult operation to perform and has heretofore required special handling apparatus.

It is the primary object of the present invention to provide a die handling unit which can be used in conjunction with a conventional industrial fork truck to handle and transport dies and the like.

Another object is to provide a die handling unit with which dies can easily be loaded or unloaded at any desired height and angle to the truck.

According to one feature of the invention, the die is not required to be lifted, but is slid horizontally on and off of a platform of the unit to and from a machine or storage shelf.

A further object is to provide a die handling unit in which the die is pulled onto the unit and is pushed therefrom by power mechanism.

A further object is to provide a unit which can easily be picked up and released by the forks of a standard industrial fork truck and which is securely held against accidentally being displaced when on the truck.

The above and other objects and features of the invention will be more readily apparent from the following description when read in connection with the accompanying drawing, in which:

Figure 1 is a perspective view of a die handling unit embodying the invention;

Figure 2 is a top plan view with parts broken away and in section;

Figure 3 is a longitudinal vertical section through the unit; and

Figure 4 is a transverse vertical section.

The unit as shown comprises a base indicated generally at 10 which may be made up of standard structural forms such as the U-beams shown. The base includes a pair of elongated side beams 11 which are illustrated as U-beams with their channels opening outward connected by cross beams 12. As shown, a single cross beam connects the side beams near one end of the base and a pair of cross beams are located relatively close together near the opposite end of the base.

A platform indicated generally at 13 is supported above the base and is preferably hollow to provide space for the power mechanism described hereinafter.

As shown the platform is formed by a pair of elongated beams 14 connected at their bottom by a bottom plate 15. Cross beams 16 extend across the ends of the beams 14 and if desired intermediate cross beams may be provided for additional strength. A platform top 17 is carried on the top of the platform and is formed with a pair of spaced elongated slots 18. If desired, the platform top may be formed of a single plate slotted out to form the slots 18 or can be formed by three separate plates assembled in spaced relation to leave the slots 18 between them as illustrated.

The platform is supported on the base for rotatable movement thereon and for this purpose an annular horizontal bearing is provided. As best seen in Figures 3 and 4 the bearing comprises annular bearing rings 19 secured respectively to the top of the base and to the bottom of the platform bottom plate 15 with balls or similar anti-friction members 21 between the rings. The bearing is supported between the side rails 11 near the outer end of the base at which the two cross members 12 lie closely adjacent to each other. Additional short supporting beams 22 may be provided between the adjacent cross members 12 for further strength if desired.

In this way the platform is rotatably supported near one end of the base for free rotary movement about a vertical axis. The length of the platform is preferably such that when its length is parallel to the base as shown in Figure 1, it will project slightly beyond one end of the base and will terminate short of the opposite end thereof. The platform can be turned to any desired angle relative to the base as will be apparent and can be locked in position by a latch mechanism as shown in Figure 3. This mechanism comprises a dog 23 pivoted to lugs 24 on the base and having a nose portion to engage the upper bearing ring 19. The dog includes a tail portion including an adjustable bolt 25 to engage a cam 26 pivoted on the lugs 24 and having a pedal 27 projecting therefrom to be engaged by the foot of the operator. When the pedal is depressed the cam will lock the dog 23 into engagement with the upper bearing ring to hold the platform against rotation on the base. When the pedal is moved upward the dog will be released and the platform can turn freely. To draw dies or like heavy articles onto the base and to push them therefrom, a pusher bar 28 is provided extending transversely across the base. The pusher bar is supported by a pair of operating plates 29 which extend through the slots 18 and terminate below the platform top. The operating plates 29 carry guide rollers 31 which fit in guide channels formed by angle strips 32 secured to the beams 14 so that the bar will be accurately held and guided for movement on the platform.

To provide power for moving the pusher bar, a fluid motor 33 of the piston and cylinder type is mounted in the hollow platform with one end of the cylinder anchored in the platform as shown at the left in Figures 2 and 3. The end of the piston is connected to a frame 34 which includes a pair of longitudinally extending side bars 35 and a front cross piece 36. The side bars 35 carry sprocket wheels 37 spaced longitudinally of the platform and having sprocket chains 38 threaded thereover. If desired the front sprocket wheels 37 may be connected by a through shaft in the cross piece 36 to insure rotation together. The sprocket chains 38 are secured to the platform bottom plate at one point in their length by brackets 41 and at diametrically opposite points are secured to the operating plates as indicated at 42. Thus, as the frame 34 is moved longitudinally the chains will travel over the sprockets and the connecting points 42 will have a motion equal to twice the motor motion.

The sprockets and chains thus constitute a motion multiplying means to move the pusher bar substantially the full length of the platform with a motor whose motion is only half the platform length and which can therefore be housed within the platform. The motor is supplied with operating fluid through connections 43 to its opposite ends from a swivel connector 44 mounted centrally of the bearing 19. Fluid supply connections 45 may lead to any desired source of fluid pressure such as the usual hydraulic pump on an industrial truck.

In order to support the base on the forks of an industrial truck as illustrated in dotted lines at 46 in Figure 3 the cross beams 12 are provided with openings 47 therethrough near the side beams 11. These openings are so spaced that the standard forks on an industrial fork truck will fit through them as indicated in Figure 3 to hold the base securely on the forks. Since the forks fit into openings in the base, tilting of the base on the forks is limited and to prevent accidental sliding of the base from the forks openings 48 may be formed in the ends of the side beams 11 to receive pins extending back of the forks. Thus the base can easily be picked up and released by a standard fork truck but is securely held against accidental displacement or tilting when it is on the truck.

To use the unit, the base may be picked up by a fork truck and carried thereby to a machine or a storage shelf on which the die to be moved is placed. The platform can be adjusted to the same level as the die and can be turned to an angle such that the die can be slid onto its outer end. The pusher bar may then be advanced to the end of the platform as indicated in dotted lines in Figure 3 and can be secured to the die by chains or the like as shown at 49 in Figure 3 which are secured to brackets 51 on the back surface of the pusher bar. The motor can then be energized to move the pusher bar to the left as seen in Figure 3 to pull the die from the shelf or machine onto the platform.

After the die has been transported to the desired place, either the machine or the storage shelf, the platform can be brought to the proper level corresponding to the bed plate of the machine or the level of the storage shelf and can be turned on the base to the necessary angle to register properly with the machine or the shelf. At this time the motor 33 can be energized to expand and move the pusher bar toward the outer end of the platform to push the die from the platform onto the machine or the shelf. Due to the motion multiplying means the pusher bar will move substantially completely to the end of the platform to force the die from the platform onto the desired working storage position.

While one embodiment of the invention has been shown and described in detail herein, it will be understood that this is illustrative only and is not to be taken as a definition of the scope of the invention, reference being had for this purpose to the appended claims.

What is claimed is:

1. A die handling unit comprising a flat base formed with elongated parallel openings therein to receive the forks of a fork lift truck, a flat horizontal platform above the base, an annular horizontal bearing supporting the platform on the base for rotation about a vertical axis, a pusher bar slidable over the platform, the platform having elongated slots therein, operating plates for the pusher bar extending through the slots, a piston and cylinder fluid motor secured at one end to the platform beneath its top, and motion multiplying means connecting the other end of the motor to the operating plates whereby when the motor is operated the pusher bar will have a multiplied movement over the platform.

2. A die handling unit comprising a flat base formed with elongated parallel openings therein to receive the forks of a fork lift truck, a flat horizontal platform above the base, an annular horizontal bearing supporting the platform on the base for rotation about a vertical axis, a pusher bar slidable over the platform, the platform having elongated slots therein, operating plates for the pusher bar extending through the slots, the platform being hollow beneath the slots, a linearly expansible and contractible fluid motor in the hollow platform secured at one end thereto and lying parallel to the slots, and motion multiplying means connecting the other end of the motor to the operating plates.

3. A die handling unit comprising a flat base formed with elongated parallel openings therein to receive the forks of a fork lift truck, a flat horizontal platform above the base, an annular horizontal bearing supporting the platform on the base for rotation about a vertical axis, a pusher bar slidable over the platform, the platform having elongated slots therein, operating plates for the pusher bar extending through the slots, the platform being hollow beneath the slots, a linearly expansible and contractible fluid motor, in the hollow platform secured at one end thereto and lying parallel to the slots, a pair of spaced rotatable sprockets connected to the other end of the motor to be shifted bodily thereby, a chain threaded over the sprockets and secured at one point in its length to the platform, and a connection between the chain and the operating plates.

4. A die handling unit comprising a base formed with elongated openings therethrough to receive the forks of a fork truck, a platform above the base, a bearing including annular bearing rings secured to the top of the base and the bottom of the platform supporting the platform on the base for rotation about a vertical axis, latch mechanism on the base engageable with the bearing ring on the platform to hold the platform against rotation, a pusher bar slidable over the platform, and power means carried by the platform and connected to the pusher bar to move it.

5. A die handling unit comprising a base formed with elongated openings therethrough to receive the forks of a fork truck, a platform above the base, a bearing including annular bearing rings secured to the top of the base and the bottom of the platform supporting the platform on the base for rotation about a vertical axis, a pusher bar movable over the platform, operating plates connected to the pusher bar, the platform having elongated slots therein transverse to the pusher bar through which the operating plates extend, cooperating guide parts on the plates and the platform to guide the pusher bar for movement parallel to the slots, a linearly expansible and contractible fluid motor secured at one end beneath the platform and lying parallel to the slots, and motion multiplying means connecting the other end of the motor to the operating plates.

6. A die handling unit comprising a base formed with elongated openings therethrough to receive the forks of a fork truck, a platform above the base, a bearing including annular bearing rings secured to the top of the base and the bottom of the platform supporting the platform on the base for rotation about a vertical axis, a pusher bar movable over the platform, operating plates connected to the pusher bar, the platform having elongated slots therein transverse to the pusher bar through which the operating plates extend, cooperating guide parts on the plates and the platform to guide the pusher bar for movement parallel to the slots, a linearly expansible and contractible fluid motor secured at one end beneath the platform and lying parallel to the slots, a pair of rotatable wheels spaced lengthwise of the slots, a tension member fitting over the wheels and connected at one point to the platform, a connection from the other end of the motor to the wheels to move the wheels bodily, and a connection between the tension member and the operating plates.

7. A die handling unit comprising a base formed with elongated openings therethrough to receive the forks of a fork truck, a platform above the base, a bearing including annular bearing rings secured to the top of the base and the bottom of the platform supporting the platform on the base for rotation about a vertical axis, a pusher bar movable over the platform, operating plates connected to the pusher bar, the platform having elongated slots therein transverse to the pusher bar through which the operating plates extend, cooperating guide parts on the plates and the platform to guide the pusher bar for movement parallel to the slots, a linearly expansible and contractible fluid motor secured at one end beneath the platform and lying parallel to the slots, a frame connected to the other end of the fluid motor to be moved thereby parallel to the slots, pairs of wheels on opposite sides of the frame spaced lengthwise of the slots, tension elements fitting over the wheels of the respective pairs and each secured at one point in its length to the platform, and connections between the tension elements and operating plates respectively.

References Cited in the file of this patent

UNITED STATES PATENTS

| Number | Name | Date |
| --- | --- | --- |
| 1,432,328 | Gee | Oct. 17, 1922 |
| 1,808,898 | Kerr | June 9, 1931 |
| 1,826,116 | Andrews | Oct. 6, 1931 |
| 1,910,398 | Ludington | May 23, 1933 |
| 2,120,042 | Remde | June 7, 1938 |
| 2,187,419 | Field | Jan. 16, 1940 |
| 2,258,988 | Le Laurin | Oct. 14, 1941 |
| 2,318,886 | Paiement | May 11, 1943 |
| 2,330,802 | Andersen et al. | Oct. 5, 1943 |
| 2,409,302 | Millikin | Oct. 15, 1946 |
| 2,410,373 | Westervelt, Jr. | Oct. 29, 1946 |
| 2,479,623 | Johnson | Aug. 23, 1949 |
| 2,579,409 | White | Dec. 18, 1951 |
| 2,582,759 | Sass | Jan. 15, 1952 |
| 2,620,930 | Mullgardt | Dec. 9, 1952 |